United States Patent [19]

Kerns et al.

[11] Patent Number: 4,698,197

[45] Date of Patent: Oct. 6, 1987

[54] MAGNETIC SHIELDING

[75] Inventors: John A. Kerns, Livermore; Roger R. Stone, Walnut Creek; Joseph Fabyan, Livermore, all of Calif.

[73] Assignee: The United States of America as represented by the United States Department of Energy, Washington, D.C.

[21] Appl. No.: 701,010

[22] Filed: Feb. 12, 1985

[51] Int. Cl.⁴ ............................................. G21B 1/00
[52] U.S. Cl. .............................. 376/142; 174/35 MS; 174/35 R
[58] Field of Search ............... 376/142, 143; 336/178; 174/35 R, 35 GC, 35 MS, 94 R

[56] References Cited

U.S. PATENT DOCUMENTS

| | | | |
|---|---|---|---|
| 2,877,286 | 3/1959 | Vance et al. | 174/35 MS |
| 3,231,663 | 1/1966 | Schwartz | 174/35 MS |
| 3,347,978 | 10/1967 | Simon et al. | 174/94 R |
| 3,903,328 | 9/1975 | Burdette, Jr. et al. | |
| 4,163,821 | 8/1979 | Nienart et al. | |
| 4,413,527 | 11/1983 | Sugiura et al. | |
| 4,434,541 | 3/1984 | Powers, Jr. | 174/35 GC |

*Primary Examiner*—Deborah L. Kyle
*Assistant Examiner*—Richard L. Klein
*Attorney, Agent, or Firm*—Henry P. Sartorio; L. E. Carnahan; Judson R. Hightower

[57] ABSTRACT

A magnetically-conductive filler material bridges the gap between a multi-part magnetic shield structure which substantially encloses a predetermined volume so as to minimize the ingress or egress of magnetic fields with respect to that volume. The filler material includes a heavy concentration of single-magnetic-domain-sized particles of a magnetically conductive material (e.g. soft iron, carbon steel or the like) dispersed throughout a carrier material which is generally a non-magnetic material that is at least sometimes in a plastic or liquid state. The maximum cross-sectional particle dimension is substantially less than the nominal dimension of the gap to be filled. An epoxy base material (i.e. without any hardening additive) low volatility vacuum greases or the like may be used for the carrier material. The structure is preferably exposed to the expected ambient magnetic field while the carrier is in a plastic or liquid state so as to facilitate alignment of the single-magnetic-domain-sized particles with the expected magnetic field lines.

22 Claims, 3 Drawing Figures

MAGNETIC SHIELDING

BACKGROUND OF THE INVENTION

This invention was made in the course of or under prime contract W-7405-ENG-48 between the U.S. Department of Energy and the University of California.

This invention relates generally to magnetic shielding. In particular, it relates to a large scale multi-part magnetic shield and/or a method of constructing a large scale multi-part magnetic shield especially useful in the vicinity of very high strength magnetic fields such as those found in plasma confinement devices (e.g. such as those found in conjunction with nuclear fusion reactors).

It is well known that magnets used in plasma confinement machines (e.g. such as those found in nuclear fusion reactors) generate very high strength ambient magnetic fields which permeate many areas in and around such devices. Associated electronic components and/or diagnostic equipment typically must be protectively shielded from such high strength magnetic fields if they are to function properly and reliably. Ferro-magnetic or ferrite alloy sheets and/or plates are conventionally formed into magnetic shielding structures so as to "bend" ambient magnetic field lines around the objects to be protected. (As will be understood, in some instances, the magnetic shield may encompass the source of such ambient magnetic fields so as to effectively shield structures located external to the enclosed shielded volume).

It is also well known that such magnetic shields should wherever possible, be made in one piece (i.e. without gaps) so as to provide a more uniform and continuous low impedance path for the ambient magnetic field lines. However, for various reasons, it is sometimes not possible or practical to make such shields entirely unitary (e.g. by welding all joints or the like). Rather, in some installations it is necessary or desirable to leave the shield as a multi-part structure (e.g. for ease of disassembly and access to the protected electronic circuits or the like).

It necessarily follows that multi-part magnetic shield structures include gaps disposed between juxtaposed portions and that such gaps may provide higher magnetic circuit impedance (i.e. less magnetic permeability) which, in turn, causes the magnetic flux to fringe about the gap and thus extend into the protected volume within the shield structure. This necessarily deteriorates the shield effectiveness.

If the gap can always be located in a direction which happens to be parallel to the ambient magnetic field lines (e.g. see FIG. 1A), then this reduction in efficacy might be minimized. However, where the gaps are disposed at arbitrary or transverse angles with respect to the ambient magnetic field lines (e.g. see FIG. 1B), then fringing fields about the gap and reductions in shield efficacy can be expected.

For many applications, especially in the vicinity of nuclear fusion reactors, joints between magnetic shielding subcomponents can be expected to have various angular intersections with ambient magnetic field lines such as generally depicted in FIG. 1B. In such circumstances, the multi-piece shield with its inherent gaps fails to conduct the ambient magnetic field around the enclosed protected volume as effectively as a one piece shield because of leakage and/or fringing fields associated with the gaps in the multi-part shield structure.

The reduced efficacy problem just discussed is particularly noticeable in typical plasma confinement machines not only because of the usual very high strength ambient magnetic fields but also because of the relatively large and massive size of typical multi-part shield structures in this environment make it expensive and perhaps even impractical or impossible to maintain minimum gap dimensions by machining all of the juxtaposed portions to highly accurate mechanical tolerances. For example, in one typical environment, the multi-part shield structures may comprise two inch thick iron members (e.g. soft iron, or C-10-10 carbon steel or C-10-08 carbon steel or speciality steels such as Alleghany Ludlum 47-50, Conetic metal, Permaloy, Mu-metal, etc.) on the order of sixty inches in diameter. In such a massive large scale structure, it may be impractical to maintain machined surface tolerances to maintain a gap size any less than about 0.005 inch or larger.

As will be appreciated, the loss of efficacy is directly related to the nominal gap size between the substructures of a multi-part magnetic shield. While it may be possible to accurately machine interfaced joints or mating surfaces of adjoining substructures to very high tolerances (e.g. on the order of 0.001 inch or less) for relatively small scale equipment, larger scale apparatuses (e.g. such as might be found on neutral beam or diagnostic equipment or nuclear fusion devices having maximum dimensions in excess of one meter in size) make it either impossible or very expensive to machine the mating surfaces of the substructure to such fine gap tolerances.

Of course the general problem of providing hermetic electromagnetic shielding is an old one in the art. For example, attention is drawn to the following examples (but in no way exhaustive) of prior issued U.S. patents relating to this general subject:

U.S. Pat. No. 3,903,328 —Burdette, Jr. et al (1975)
U.S. Pat. No. 4,413,527 —Sugiura et al (1983)
U.S. Pat. No. 4,163,821 —Nienart et al (1979)

Burdette, Jr. et al discloses a conductive coating which includes a metallic copper pigmented resin which includes graphite pigmentation as well to provide an electrically conductive coating to the external surfaces of an article so as to provide electromagnetic and electrostatic shielding and grounding. Sugiura et al simply teaches a two-part metal housing structure where the two parts are secured mechanically one to the other by screws. Nienart et al discloses a method of making an adhesively bonded metallic glass fabric which provides a flexible magnetic shield structure. Nienart et al uses a polymeric adhesive curable to a solid state and provides many examples. The disclosure of each of these prior patents is hereby incorporated by reference.

Various commercially available epoxy materials are also available wherein iron powder or other forms of metallic particles are dispersed throughout a plastic or "putty-like" epoxy base which, when mixed with a suitable epoxy hardener material, forms a metallic epoxy material which cures to a solid form. For example, such a product is conventionally available from Devcon.

However, prior to our invention, there remained the need for an efficient technique to reduce the effective size of the gap in a large scale multi-part magnetic shield structure so as to reduce the effective impedance of interface joints to the magnetic field which is intended to flow thereacross. For example, in at least one case, when a large scale multi-part magnetic shield structure was in place with high strength ambient magnetic fields, there was still a magnetic field of approximately 40 Gauss present within the "protected" volume enclosed by the shield.

Now, however, we have discovered a new multi-part magnetic shield structure and method for making it which results in a much improved large scale multi-part magnetic shield structure with relatively small required additional cost and effort. This new technique is also easily applicable to virtually any arbitrary large scale shape of multi-part magnetic shield structures. In one case, a 40 Gauss magnetic field within the "protected" volume was effectively reduced to approximately 20 Gauss by the use of this invention.

SUMMARY OF THE INVENTION

In brief summary, a magnetically-conductive filler material (e.g. a ferro-magnetic compound or "slurry" in either "putty-like", plastic or liquid form) is inserted within the gap between juxtaposed portions or mating surfaces of adjacent substructures in a large scale multi-part magnetic shield. The filler comprises single magnetic domain-sized particles of a magnetically conductive material dispersed throughout a carrier (typically a non-magnetically conductive binder which is at least initially in a plastic or liquid state but which may, if desired, thereafter harden to a solid state). The maximum particle size should be less than the nominal gap size. Smaller particle sizes and heavier concentrations of particles and even distribution of particles within the carrier are preferred to better enable magnetic flux to travel relatively unimpeded directly across the gap or joint through substantially adjacent metallic particles within the carrier material thus reducing the effective impedance of the magnetic circuit across the gap.

Preferably the minimum size of magnetic domains in the material from which the particles are created is at least equal to or larger than the maximum particle size such that each particle will substantially include only a single magnetic domain which can then be aligned with the expected ambient magnetic flux field lines by exposing the filler material disposed within the gap to such ambient magnetic fields while the carrier is in a plastic or liquid state. In this manner, the effective impedance of the magnetic circuit across the gap is further reduced.

Although several epoxy compounds on the market use an epoxy base which contains metallic material to provide strength or increased volume, use in this invention requires that the metallic particles within the epoxy base exhibit relatively high magnetic field conductivity.

The magnetically-conductive filler material is injected, applied, poured or otherwise introduced into the interface joint gaps when the multi-part magnetic shield is assembled. The plastic or liquid form of the filler material will thus conform to any arbitrary shape of adjacent mating surfaces and completely fill the gap between such surfaces as they are bolted or suitably positioned or otherwise secured with respect to one another.

For large scale structures such as those mentioned above, a nominal 0.005 inch gap dimension may typically produce a gap dimension which varies considerably from that nominal value if economic machining and/or metal forming practices are utilized. Accordingly, the minimum gap size may be on the order of 0.001-0.002 inch or so and the particle sizes within the carrier should accordingly be no more than such expected minimum gap dimensions if possible. At the moment, it appears relatively easy to commercially obtain particles of magnetically conductive material having maximum particle dimensions on the order of 0.002 inch. Since the minimum magnetic domain size in such materials is believed to be considerably larger, it follows that these conventionally available iron powders or the like meet the above discussed requirement that they be "single magnetic domain sized" (e.g. that substantially only a single magnetic domain exists within most single particles). Should they be available, particle sizes of 0.001 inch or even less would be preferred for use with this invention.

BRIEF DESCRIPTION OF THE DRAWINGS

These as well as other objects and advantages of this invention will be more completely appreciated and understood by reading the following detailed description of the presently preferred exemplary embodiments of this invention taken in conjunction with the accompanying drawings, of which.

DETAILED DESCRIPTION OF THE PREFERRED EMBODIMENTS

Figure 1A:
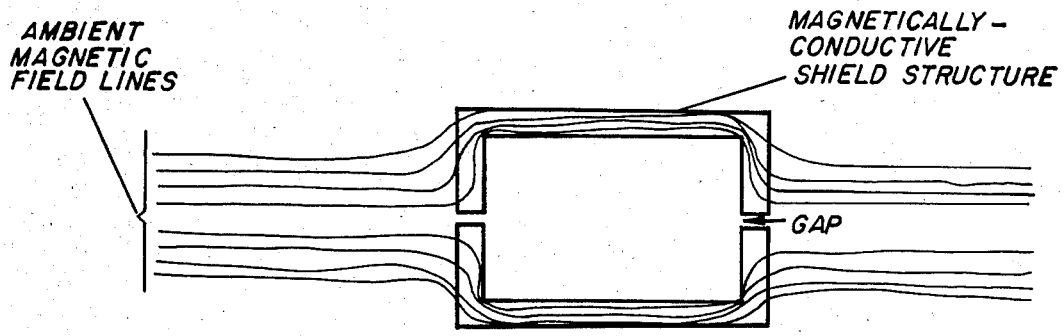
FIG. 1A schematically depicts a typical prior art multi-part magnetic shield structure having its gaps aligned with an ambient magnetic field.
Figure 1B:
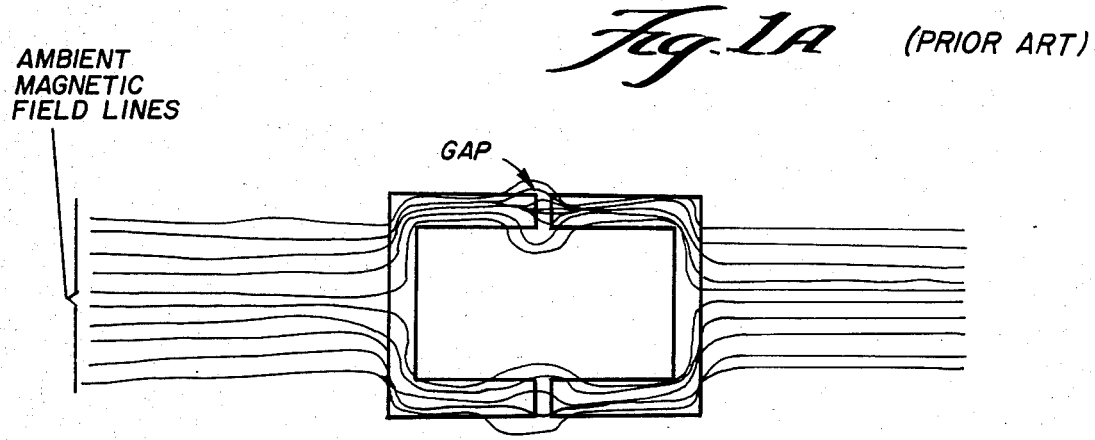
FIG. 1B schematically depicts a typical prior art multi-part magnetic shield structure having its gaps non-aligned with an ambient magnetic field.

As depicted in FIGS. 1A and 1B, when large scale (e.g. greater than 1 meter in maximum cross-sectional dimension) multi-part magnetic shield structures have gaps in the magnetic circuit nonaligned with the ambient magnetic field, significant leakage/fringing of magnetic fields into the protected enclosed volume can be expected.

Figure 2:
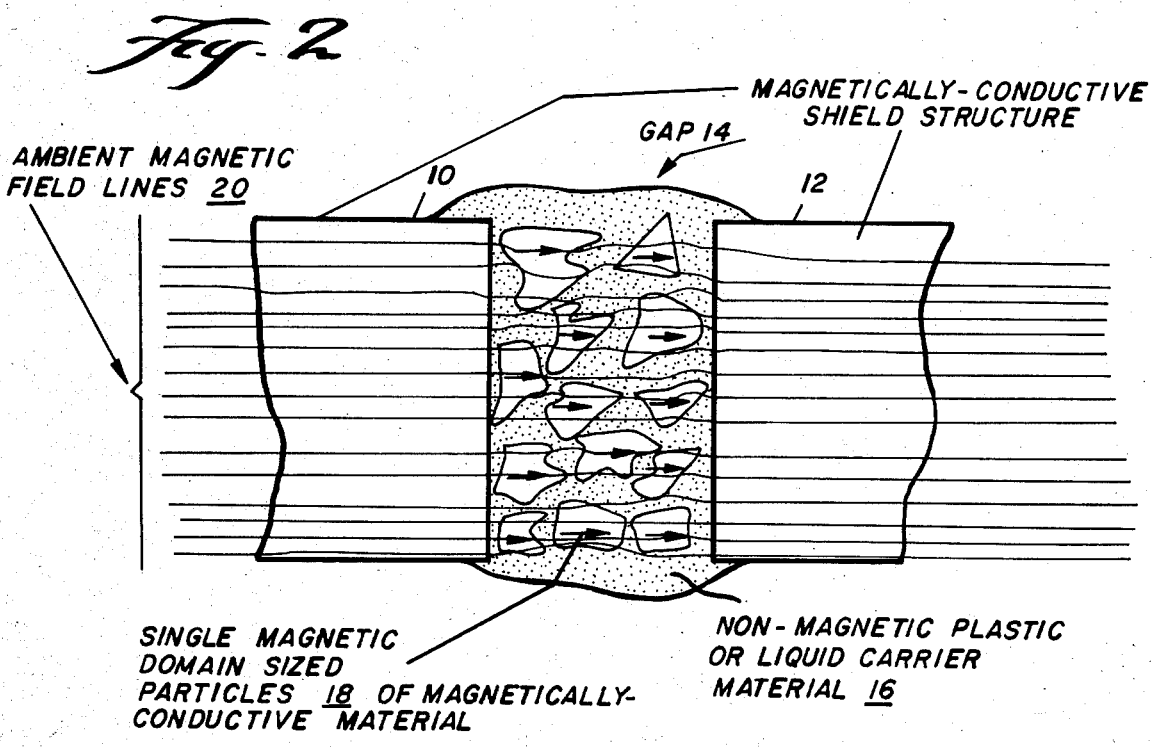
FIG. 2 schematically depicts an exemplary large scale multi-part magnetic shield structure constructed in accordance with an exemplary embodiment of this invention.

Adjacent magnetically conductive shield substructures 10, 12 are depicted in FIG. 2 having a gap 14 of predetermined nominal dimension (e.g. a nominal size of 0.005 inch) disposed between juxtaposed portions of substructures 10, 12. The gap 14 is filled with a carrier material 16 having dispersed therein a heavy concentration, preferably about 80% or more by weight, of single-magnetic-domain-sized particles 18 formed from magnetically conductive material. As depicted, the particles also have a maximum cross-sectional dimension which is substantially less than the nominal gap size (e.g. 0.002 inch maximum particle size for 0.005 inch nominal gap dimension). As already mentioned, the exemplary embodiment of FIG. 2 may be utilized in a large scale multi-part shield structure having maximum cross-sectional dimension greater than about 1 meter such as might be found disposed within high strength ambient magnetic field 20 found in the environment of a plasma confinement device.

As also depicted in FIG. 2 (by small arrows within each particle), most individual particles preferably include but a single magnetic domain which is aligned with the expected path of magnetic flux crossing the gap 14. This may be achieved, for example, by subjecting the filler materials within gap 14 to the expected ambient magnetic field while the carrier material 16 is in a plastic or liquid state.

In the exemplary embodiment, particles 18 comprise metallic grains having a maximum cross-sectional dimension on the order of 0.002 inch and are formed from a magnetically-conductive (i.e. relatively high magnetic permeability) material such as (a) soft iron, (b) carbon steel or (c) other steels, speciality steels, and the like as mentioned above and as will be appreciated by those in the art. Such particles may themselves be formed as a byproduct of conventional machining/metal forming processes and/or by any other conventional methods of forming metal powders or particles.

In one exemplary embodiment, the carrier material comprises the non-cured base of polymeric adhesive curable to a solid state if a hardening component is added (e.g. such as those disclosed in the earlier reference Nienart et al patent). For example, Devcon commercially provides a metallic epoxy product in which a metallic powder dispersed within a putty-like epoxy base may be mixed with an epoxy hardener component to form a metallic epoxy material. In one exemplary embodiment, the putty-like metallic epoxy base alone (without the hardener additive) was used as the magnetically conductive filler. It may be pressed or otherwise inserted into gap 14. For example, a bead of such material may be laid along one boundary of the gap forming structure before the other member is juxtaposed to actually form the gap. As also earlier mentioned, in the preferred embodiment, the filler within gap 14 is subjected to the expected ambient magnetic field lines 20 while the metallic powder-filled epoxy is still in a plastic state so that the single magnetic domain sized particles 18 therewithin may align their magnetic domains with the expected magnetic field lines through gap 14. (This procedure would, of course, be applicable where the filler is conditioned to subsequently harden to a solid state.)

Other carrier materials which are non-metallic and non-magnetically conductive and at least some times in a plastic or liquid state may also be employed. For example, a low-volatility grease may be mixed with a supply of suitably sized iron powder particles to provide a pliable non-hardening filler which would facilitate easy disassembly/reassembly of the multi-part shield structure. For example, a Dow Corning high vacuum grease is available from Dow Corning Corporation, Midland, MI 48640 or another low volatility grease sometimes referred to as "Apiezon" grease is available from Apiezon Products Ltd., 4 York Road, London SE1. Any other grease or putty-like substance filled with suitably sized and dispersed metallic magnetically-conductive particles may also be employed as the filler.

Only the putty-like metallic epoxy base material was actually used in one exemplary embodiment. That is, the metal-powder filled putty-like epoxy base was not mixed with the usual epoxy hardener so as to actually form a metallic epoxy plastic material which eventually cures to a solid state. Of course, if one wishes to temporarily or permanently adhere the shield substructures together, then the hardener material might also be utilized to form a polymeric adhesive curable to a solid state. In that event, additional metallic powder particles may be added if desired so as to maintain the desired relatively high concentration of particles per unit volume. Other types of non-adhesive polymeric materials curable to a solid state might also be used to better maintain the capability of ready disassembly.

As should be appreciated, where the non-magnetic plastic or liquid carrier material 16 does not cure to a hardened state, then the single magnetic domain size particles 18 are free to orient themselves in alignment with the applied ambient magnetic field at any time the shield structure is exposed to such a field. In this manner, the alignment might even conceivably change slightly if substantially different relative orientations of ambient magnetic fields are encountered by the assembled multi-part shield structure.

When a multi-part magnetic shield structure is assembled in accordance with this invention, the resulting structure will have magnetic filler material distributed throughout the interfaced joint gaps. This magnetically conductive filler material thus provides for reduced impedance to the passage of magnetic flux across the gap regardless of relative orientation between the magnetic shield gaps and the ambient magnetic field. Large-scale structures (e.g. those having maximum dimensions greater than about 1 meter) may be thus realized without requiring excessive cost or labor such as might otherwise be required if closely machined tolerances are required. The resulting large scale filled-gap multi-part shield structure is quite effect in more efficiently diverting ambient magnetic fields around objects within the protected volume and is especially adapted for use on plasma research device and nuclear fusion reactors where an extensive amount of magnetic shielding is likely to be required in view of the relatively high ambient magnetic fields there expected.

While only a few presently preferred exemplary embodiments of this invention have been described in detail, those skilled in the art will appreciate that many modifications and variations may be made in these exemplary embodiments while yet retaining many of the novel features and advantages of this invention. Accordingly, all such variations and modifications are intended to be included within the scope of the appended claims.

What is claimed is:

1. A multi-part magnetic shield comprising:
   at least two magnetically-conductive structures substantially enclosing a predetermined volume, each structure enclosing a portion of the volume, but having a predetermined gap disposed between juxtaposed portions thereof and disposed substantially transversely to magnetic field lines passing through the magnetically-conductive structures; and
   a filler material disposed within said gap and including a non-magnetically conductive carrier in a liquid or plastic state having single-magnetic-domain-sized particles of a magnetically conductive solid dispersed therewithin, said particles having a maximum cross-sectional dimension not exceeding 0.002 inch.

2. A multi-part magnetic shield comprising:
   at least two magnetically-conductive structures substantially enclosing a predetermined volume, each structure enclosing a portion of the volume, but having a predetermined gap disposed between juxtaposed portions thereof and disposed substantially transversely to magnetic field lines passing through the magnetically-conductive structures; and
   a magnetically-conductive filler material disposed within said gap, said filler material including (a) a carrier material, and (b) single-magnetic-domain-sized particles of a magnetically conductive material dispersed throughout said carrier material, said particles having a maximum cross-sectional dimension not exceeding 0.002 inch, said particles also having a maximum cross-sectional dimension which is substantially less than the size of said predetermined gap.

3. A multi-part magnetic shield as in claim 2 wherein said predetermined volume has a maximum cross-sectional dimension substantially greater than one meter.

4. A multi-part magnetic shield as in claim 3 disposed in the high strength magnetic field environment of a plasma confinement device.

5. A multi-part magnetic shield as in claim 2 wherein substantially all of said particles each have a single magnetic domain which is aligned with the expected path of magnetic flux lines crossing said gap.

6. A multi-part magnetic shield as in claim 2 wherein said particles are formed from at least one of the following materials:

(a) soft iron, (b) carbon steel, or (c) steel.

7. A multi-part magnetic shield as in claim 6 wherein said carrier material comprises a liquid or plastic polymeric material curable to a solid state.

8. A multi-part magnetic shield as in claim 6 wherein said carrier material comprises an epoxy base filled with metallic particles.

9. A multi-part magnetic shield as in claim 6 wherein said carrier material comprises a grease.

10. A multi-part magnetic shield as in claim 6 wherein said carrier material is non-metallic, non-magnetically conductive and, at least sometimes in a plastic or liquid state.

11. A method of constructing a multi-part magnetic shield having plural magnetically conductive structures substantially enclosing a predetermined volume, each structure enclosing a portion of the volume, but having a pag disposed between juxtaposed portions thereof and substantially transverse to magnetic field lines passing through the structures, said method comprising the steps of:

substantially filling said gap with a magnetically conductive filler formed form a plastic or liquid non-magnetically conductive carrier substantially filled throughout with dispersed particles of a magnetically conductive material, said particles having a maximum cross-sectional dimension not exceeding 0.002 inch, said particles also having maximum cross-sectional dimension which is substantially less than the size of said predetermined gap.

12. A method as in claim 11 wherein said particles are formed as single-magnetic-domain-sized.

13. A method as in claim 11 wherein said predetermined volume is formed with a maximum cross-sectional dimension substantially greater than one meter.

14. A method as in claim 12 further comprising the step of aligning the magnetic domain of substantially all particles with the expected path of magnetic flux lines crossing said gap.

15. A method as in claim 11 wherein said particles are formed from at least one of the following materials:

(a) soft iron;

(b) carbon steel, or (c) steel.

16. A method as in claim 17 wherein said carrier material is formed of a liquid or plastic polymeric material curable to a solid state.

17. A method as in claim 15 wherein said carrier material is formed of an epoxy base filled with metallic particles.

18. A method as in claim 15 wherein said carrier material is formed of a a grease.

19. A multi-part magnetic shield as in claim 2 wherein said filler material comprises at least about 80% by weight of said particles of magnetically conductive material.

20. A method as in claim 11 wherein said filler is formed of at least about 80% by weight of said particles of magnetically conductive material.

21. A magnetically conductive filler for filling a gap within a magnetically conductive structure, comprising:

(a) a carrier material, and (b) single-magnetic-domain-sized particles of magnetically conductive material dispersed throughout said carrier material, said particles having a maximum cross-sectional dimension not exceeding 0.002 inch, said particles also having a maximum cross-sectional dimension which is substantially less than the size of a gap to be filled.

22. The filler of claim 21 wherein said filler comprises at least about 80% by weight of said particles.

* * * * *